United States Patent [19]

Bohbot et al.

[11] Patent Number: 5,140,914
[45] Date of Patent: Aug. 25, 1992

[54] VEHICLE SEAT TRAY

[76] Inventors: Marc Bohbot, 810 Brunet, Saint-Laurent, Province of Quebec, Canada, H4M145; Neil Silver, 775 Abbott, St. Laurent, Montreal, Quebec, Canada, H4M-IX2

[21] Appl. No.: 772,572

[22] Filed: Oct. 7, 1991

[51] Int. Cl.⁵ .................................................. 47B 23/00
[52] U.S. Cl. ...................................... 108/44; 108/152
[58] Field of Search ................. 108/44, 45, 49, 42, 108/43, 91; 297/152, 153, 135, 146

[56] References Cited

U.S. PATENT DOCUMENTS

| | | | |
|---|---|---|---|
| 1,088,736 | 11/1932 | Park | 100/44 X |
| 2,687,336 | 8/1957 | Smith et al. | 108/44 X |
| 2,836,187 | 5/1958 | Dunnagan | 108/44 X |
| 3,784,990 | 1/1974 | Eusofon et al. | 108/44 X |
| 4,235,472 | 11/1980 | Sparks et al. | 108/43 X |
| 4,463,684 | 8/1984 | Klungle et al. | 108/91 |

FOREIGN PATENT DOCUMENTS 65368   1/1947   Denmark ............................ 297/153

Primary Examiner—Jose V. Chen
Attorney, Agent, or Firm—Leon Gilden

[57] ABSTRACT

A removable rear seat tray for use in a vehicle includes a clamp assembly nondestructibly attachable to the rear of a bucket seat, a pair of tray suppport arms attachable to the clamp, and a slidably removable tray securable to the support arms. A tiered tray construction is provided by a further slide-on tray assembly, and a removable cushion can be selectively attached to the tiered tray structure.

1 Claim, 5 Drawing Sheets

PRIOR ART

VEHICLE SEAT TRAY

BACKGROUND OF THE INVENTION

1. Field of the Invention

The present invention relates to trays and more particularly pertains to a removable tray structure which may be selectively attached to the rear of a bucket seat in a vehicle.

2. Description of the Prior Art

The use of trays in vehicles is well known in the prior art. For example, U.S. Pat. No. 4,770,107, which issued to D. Miller on Sept. 13, 1988, discloses a portable travel tray which is attachable between the rear of an automobile seat and a child's seat positioned rearwardly thereof. Straps are utilized to effect the connection between the two seat structures. U.S. Pat. No. 4,915,035 which issued to Clark et al. on Apr. 10, 1990, discloses an automobile food service tray which is provided with slots for attaching the same to an automobile steering wheel. U.S. Pat. No. 3,939,986, which issued to J. Pierro on Feb. 24, 1976, discloses an adjustable support structure which utilizes foam pads to attach a beverage holding tray to a chair or perhaps to the back of a car seat Additionally, U.S. Pat. No. 4,850,282, which issued to S. Postic on July 25, 1989, discloses a portable food tray having hook-shaped arms which allow it to be removably positioned over the back of a chair or the like.

As can be appreciated, all of these above-discussed prior art trays are functional for their intended purposes and each are substantially useful with respect to their disclosed design. However, none of these trays are individually removable from a separate support structure which can remain attached to a car seat, nor is any provision made for a tiered tray structure which would greatly increase usable surface area. As such, the present invention substantially departs from these conventional concepts and designs and in so doing provides an apparatus which operates to present some of these missing desirable features. Therefore, it can be appreciated that there exists a continuing need for new and improved vehicle seat trays and in this regard, the present invention substantially fulfills this need.

SUMMARY OF THE INVENTION

In view of the foregoing disadvantages inherent in the known types of vehicle seat trays now present in the prior art, the present invention provides an improved vehicle seat tray construction wherein the same can be removably attached to and removed from the rear of a vehicle seat while providing for a tiered structure to increase working surface area. As such, the general purpose of the present invention, which will be described subsequently in greater detail, is to provide a new and improved vehicle seat tray which has all the advantages of the prior art vehicle seat trays and none of the disadvantages.

To attain this, the present invention essentially comprises a removable rear seat tray for use in a vehicle which includes a clamp assembly nondestructibly attachable to the rear of a bucket seat, a pair of tray support arms attachable to the clamp, and a slidably removable tray securable to the support arms. A tiered tray construction is provided by a further slide-on tray assembly, and a removable cushion can be selectively attached to the tiered tray structure.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle seat tray which has all the advantages of the prior art vehicle seat trays and none of the disadvantages.

It is another object of the present invention to provide a new and improved vehicle seat tray which may be easily and efficiently manufactured and marketed.

It is a further object of the present invention to provide a new and improved vehicle seat tray which is of a durable and reliable construction.

An even further object of the present invention is to provide a new and improved vehicle seat tray which is susceptible of a low cost of manufacture with regard to both materials and labor, and which accordingly is then susceptible of low prices of sale to the consuming public, thereby making such vehicle seat trays economically available to the buying public.

Still yet another object of the present invention is to provide a new and improved vehicle seat tray which provides in the apparatuses and methods of the prior art some of the advantages thereof, while simultaneously overcoming some of the disadvantages normally associated therewith.

Still another object of the present invention is to provide a new and improved vehicle seat tray which can be removably attached to the rear of a vehicle seat and which can provide for a tiered working surface area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, a new and improved vehicle seat tray embodying the principles and concepts of the present invention will be described.

Figure 1:
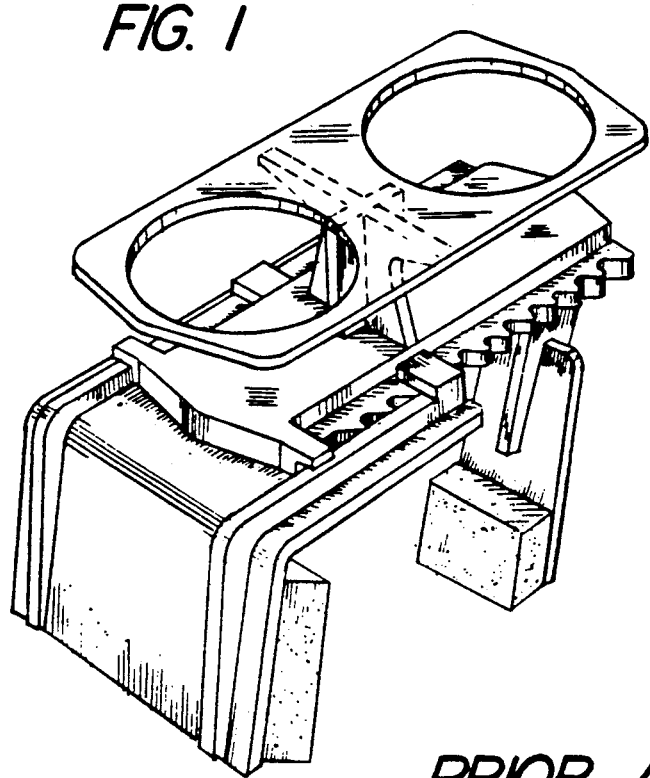
FIG. 1 is a perspective view of a prior art tray structure.
Figure 2:
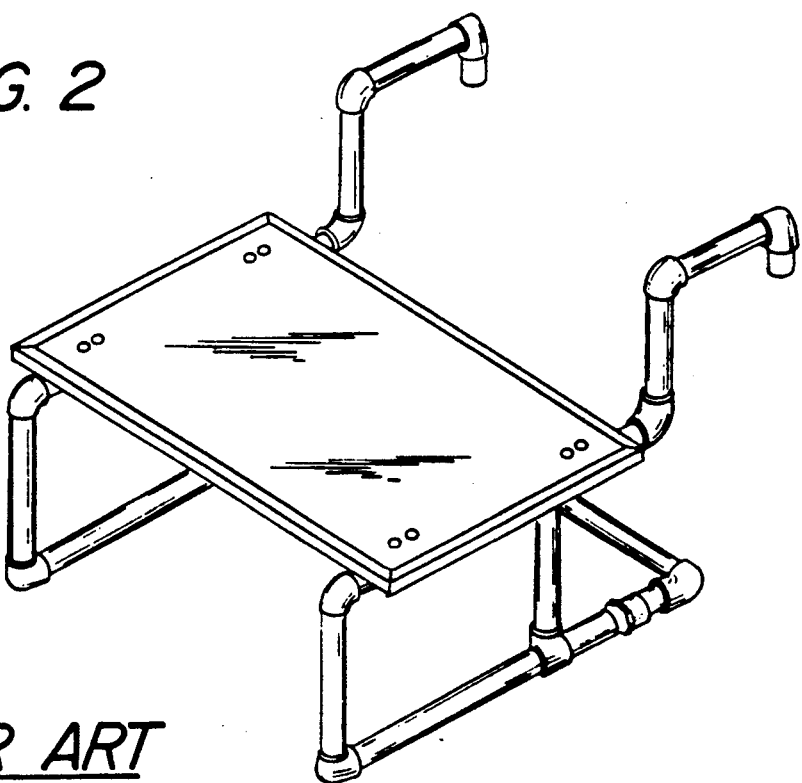
FIG. 2 is a perspective view of a further prior art tray structure.

Initially, reference is made to FIGS. 1 and 2 of the drawings wherein typical prior art vehicle seat trays are illustrated. FIG. 1 discloses an adjustable support means for a beverage holding tray as particularly disclosed in U.S. Pat. No. 3,939,986 as aforediscussed. This patent is representative of the current state of the art of a removable clamping support assembly to which a tray may be attached. As can be appreciated, this type of support provides for the tray to be positioned over the top of a seat and could result in substantial difficulty of use as well as the likelihood of contact between an individual's head therewith when the individual is seated in the associated seat.

FIG. 2 discloses a simpler support structure for a tray as particularly disclosed in U.S. Pat. No. 4,850,282 as also aforediscussed. While being functional for its intended use, it can be appreciated that this structure does not provide for a secure tray supporting arrangement since rapid vehicle movement or turning could result in the tray becoming disengaged with the seat structure and further, the support arms could provide bodily discomfort to an individual seated in the associated seat.

Figure 3:
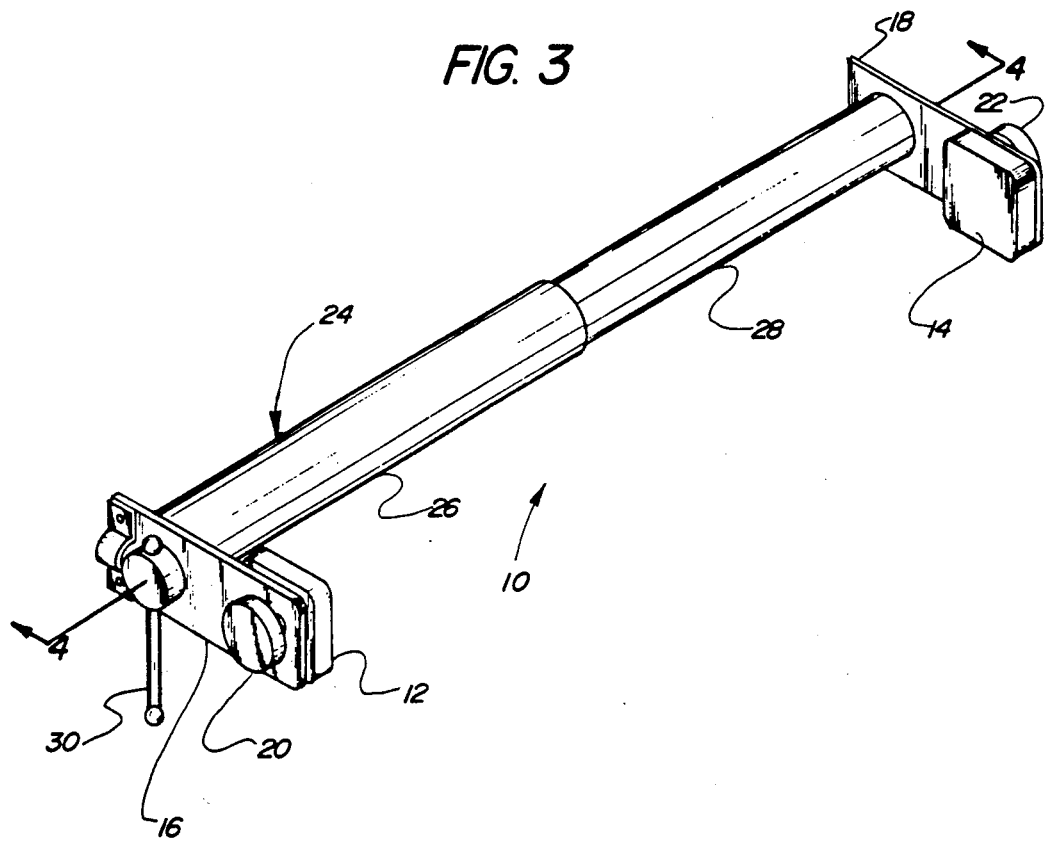
FIG. 3 is a perspective view of a tray supporting seat clamp forming a of the present invention.
Figure 4:
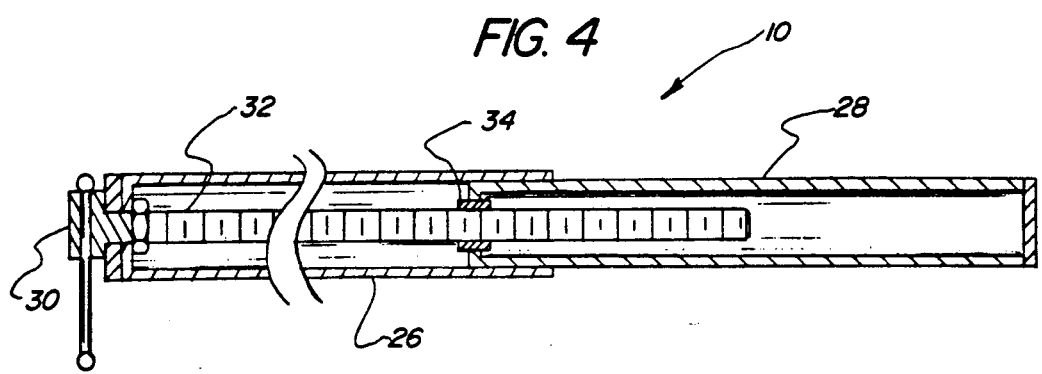
FIG. 4 a cross-sectional view of the invention as viewed along the line 4—4 in FIG. 3.

FIGS. 1 and 2 are illustrative of the disadvantages associated with many presently available prior art seat tray constructions. To overcome these prior art deficiencies, the present invention makes use of a tray support seat clamp as best illustrated in FIGS. 3 and 4 and as is generally designated by the reference numeral 10. The seat clamp 10 is designed to be positioned rearwardly of a vehicle seat and engages only the sides of the seat by means of a pair of rubber engagement pads 12, 14. The pads 12, 14 are attached to respective side plates 16, 18, and a pair of knobs 20, 22 are also fixedly secured to the respective plates 16, 18. The knobs 20, 22 are used for positioning the seat clamp 10 at the time of its attachment to the sides of an unillustrated vehicle seat.

The plates 16, 18 are interconnected by a telescoping tube structure 24. In this connection, the plate 16 is fixedly secured to a tubular member 26 and the plate 18 is secured to a tubular member 28. The tubular member 28 is telescopingly received within an interior portion of the tubular member 26, and a rotatable drive member 30 is used to adjust the relative length of the tubular support member 24. As shown in FIG. 4, this is accomplished by the fact that the drive member 30 operates to rotate an elongated threaded member 32 extending interiorly of the tubular members 26, 28. A threaded nut 34 is fixedly secured to an interior end of the tubular member 28, and the screw member 32 effectively causes the nut 34 to travel therealong as it is rotated. Accordingly, adjustable positioning of the tubular members 26, 28 can be achieved by a rotation of the drive member 30 in a now apparent manner.

Figure 5:
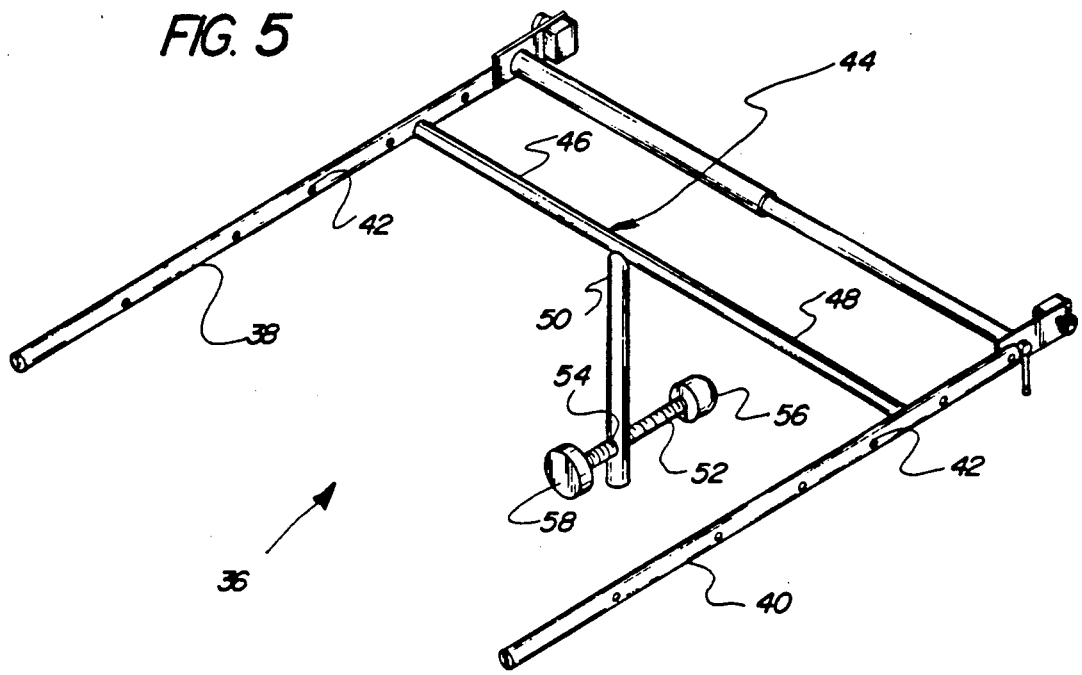
FIG. 5 is a perspective view of the tray support arms forming a part of the invention.

FIG. 5 of the drawings illustrates the tray support arm structure forming a part of the present invention and which is generally designated by the reference numeral 36. In this regard, the tray support structure 36 comprises a pair of parallelably aligned rods 38, 40, each of which is provided with a plurality of through-extending pin receiving apertures 42, and these rods are supportingly interconnected by a rod and tube structure 44. The rod and tube structure 44 comprises a hollow tubular member 46 fixedly secured to a surface of the rod 38, and a rigid rod 48 fixedly secured to a surface of the rod 40 and being slidably positionable within the tubular member 46. A downwardly extending rod 50 is attached to a bottom surface of the rod 48 and a threadably movable adjustment knob 52 extends through an aperture 54 formed in a bottommost end of the rod 50. The adjustment knob 52 is provided with a rubber pad 56 on one end thereof, and the pad 56 is abuttable against the rear of a vehicle seat to thus adjust the planar elevation of a tray in an apparent manner. In this respect, the adjustment knob 52 is threadably positioned through the aperture 54 and a turning knob 58 facilitates the rotatable adjustment thereof relative to a vehicle's seat.

Figure 6:
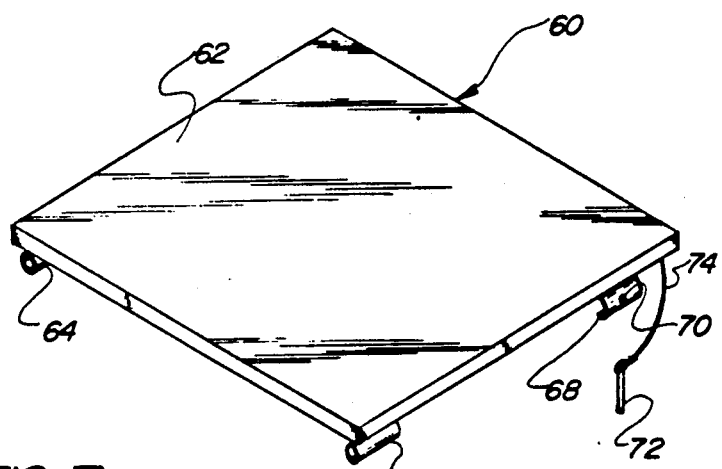
FIG. 6 is a perspective view of the tray forming a part of the present invention.
Figure 7:
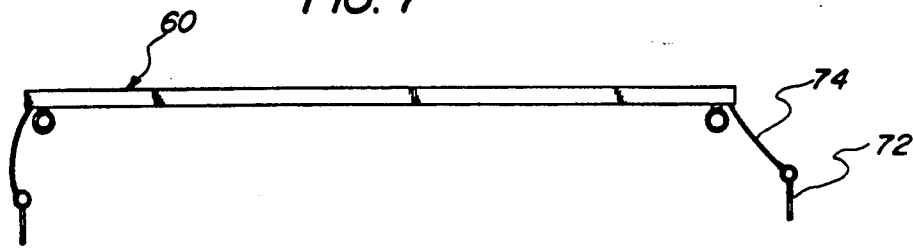
FIG. 7 is an end elevation view of the tray.

FIGS. 6 and 7 illustrate a tray 60 which forms a final part of a first embodiment of the present invention. The tray 60 includes a tray surface 62 to which is attached a pair of arm receiving tubes 64, 66. The arm receiving tubes 64, 66 are fixedly secured to a bottommost surface 62 on opposite edges thereof and are designed to slightably receive the tray support tubes 38, 40. Additionally, a pair of arm guides 68 are positioned on bottommost portions of the tray 62 on opposite edges thereof and respectively aligned with the arm receiving tube 64, 66. These guides 68 are provided with centrally positioned pin receiving apertures 70 and a pair of pens 72 may be attached to the tray 62 by tethers 74. When the tray 62 is positioned on the support arms 38, 40, the pens 72 can be directed through the aperture 70 and then through an aligned aperture 42 in the support arms 38, 40 to thus fixedly secure the tray assembly 60 to the tray support arm structure 36.

Figure 8:
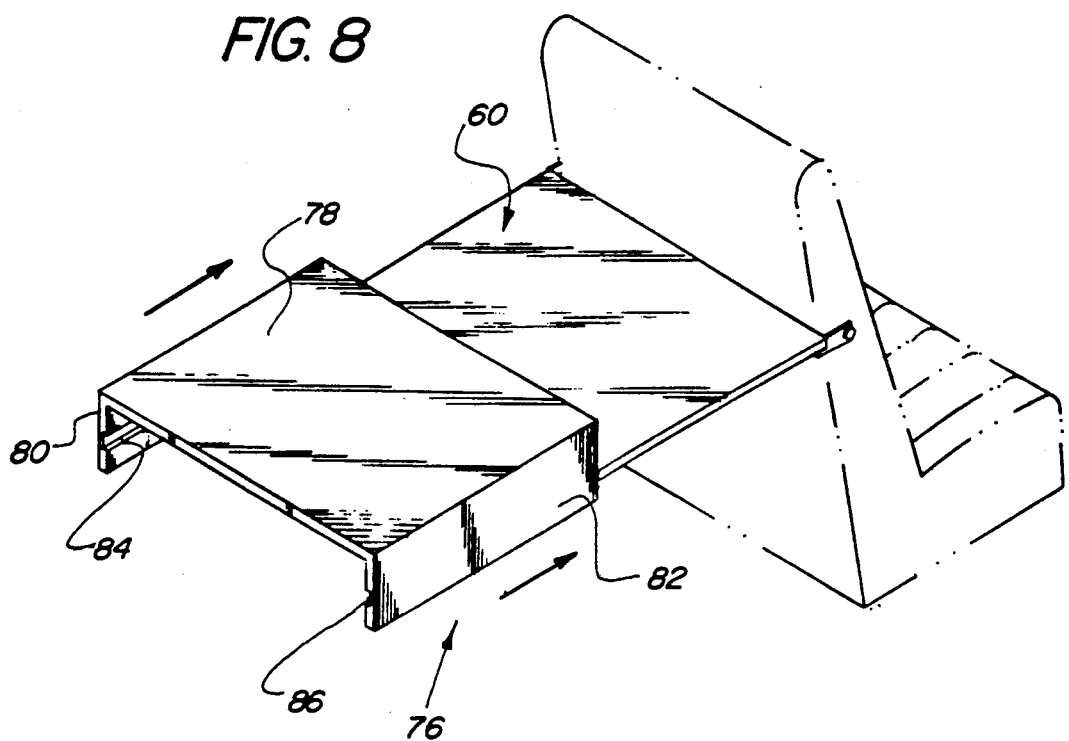
FIG. 8 is a perspective view of a second embodiment of the invention.

FIG. 8 of the drawings illustrates a second embodiment of the invention which effectively includes all of the aforediscussed tray structure in combination with a tiered tray 76. The tiered tray 76 includes a top working surface 78 and downwardly extending attached side plates 80, 82 positioned on opposite sides of the top surface. Interior slots 84, 86 are cut into the respective side plates 80, 82, and these slots slidably engage the sides of the tray structure 60 as clearly shown in FIG. 8. When the tiered structure 78 is engaged with the tray structure 60, it can be seen that two tray working surfaces 62, 78 are provided. In this regard, the tray surface 62 can be utilized to store materials or the like, while the tray surface 78 can be utilized to perform other work as desired.

Figure 9:
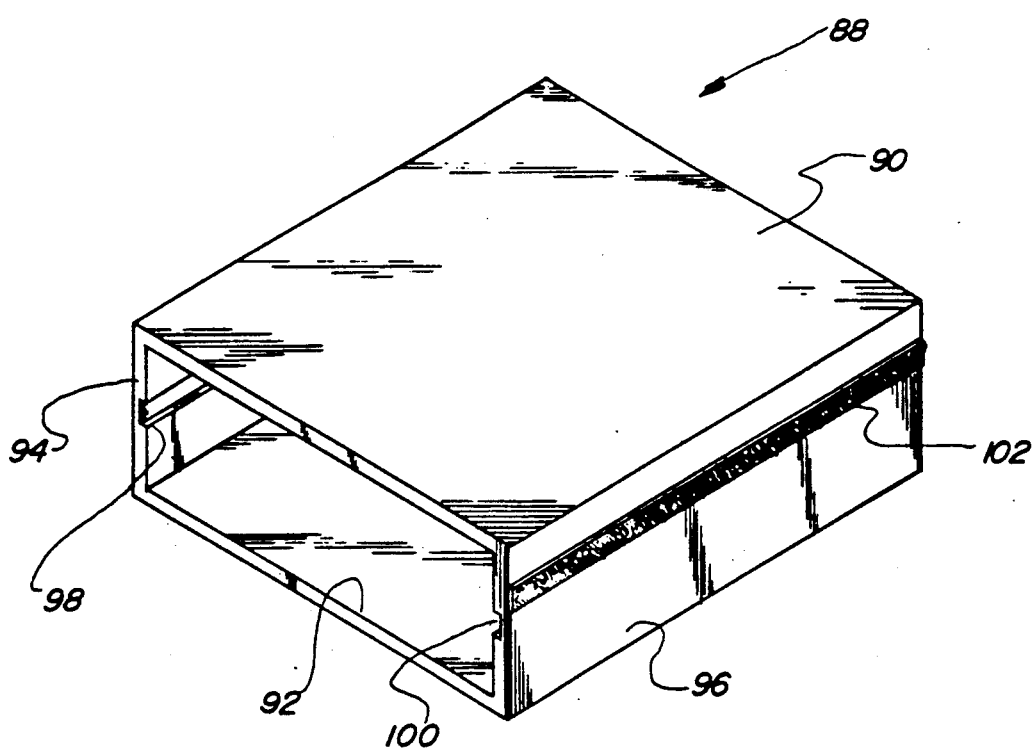
FIG. 9 a perspective view of a third embodiment of the invention.
Figure 10:
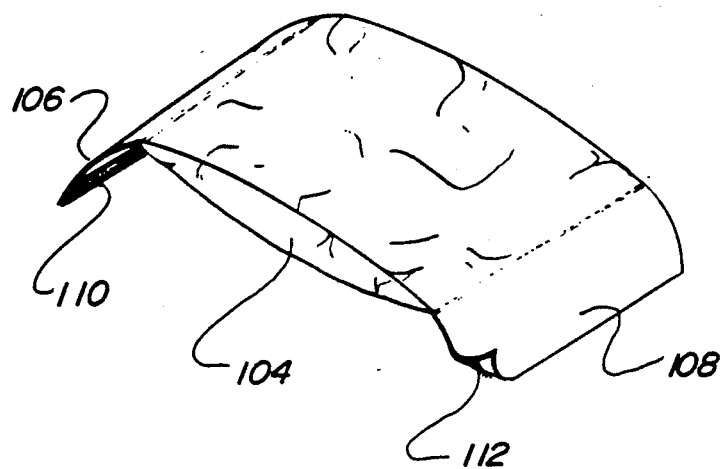
FIG. 10 is a perspective view of a cushion utilizable with the present invention.
Figure 11:
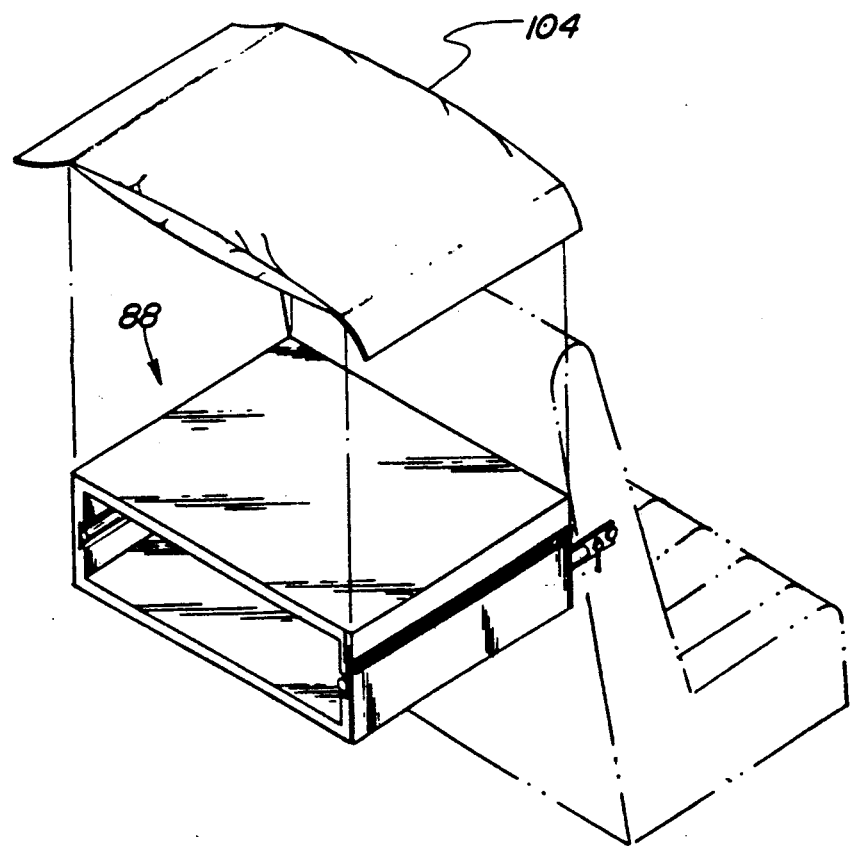
FIG. 11 is a perspective view illustrating the manner of attachment of the cushion.

FIG. 9 of the drawings illustrates a further modified embodiment of the invention wherein a double tiered tray structure 88 is illustrated. The double tiered tray structure 88 is provided with a pair of tray working surfaces 90, 92 which are parallelably aligned and fixably secured together by respective side plates 94, 96. Interior slots 98, 100 are formed in the respective side plates 94, 96, and these slots engage the tray structure 60 in the same manner as aforediscussed with respect to the tiered tray structure 76. When positioned over a tray assembly 60, three tray working surfaces 90, 62, 92 are provided for use by an individual. Additionally, the double tiered tray structure 88 may be provided with a pair of velcro side bands 102 (only one of which is illustrated), and a soft cushion 104, as shown in FIG. 10, can the be removably attached to the double tiered tray structure. In this regard, the soft cushion 104 can be provided with attached side flaps 106, 108, each of which is provided with respective velcro attachment bands 110, 112. As shown in FIG. 11, the cushion 104 can be fixedly secured to a top surface of the doubled tiered tray support structure 88 in a now apparent manner whereby an individual can then use the tray assembly as a head or arm rest.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved vehicle seat tray comprising:
   seat clamping means for engaging respective sides of a vehicle seat, said seat clamping means including first and second telescoping tubes which are selectively extensible and retractible in length by treadably moveable adjustment means, said seat clamping means further including first and second opposed facing gripping members for grasping said respective sides of said vehicle seat and being engageable therewith through a retractible movement through said first and second telescoping tubes through an actuation of said threadably moveable adjustment means;
   tray support means removably attached to said seat clamping means, said tray support means including first and second parallely aligned rods extending outwardly from a rear section of said vehicle seat when said first and second rods are attached to said seat clamping means;
   tray means slidably removably attached to said tray support means;
   second tray means slidably positioned over said tray means and being movable relative thereto, said second tray means forming a first tier structure above said tray means;
   third tray means slidably positioned under said tray means and being moveable relative thereto, said third tray means being fixedly secured to said second tray means and being concurrently moveable therewith, said third tray mans forming a second tier structure below said tray means;
   cushion means removably attached to a top surface of said second tray means;
   and
   tray angle adjustment means of adjusting a horizontal alignment of a top surface of said tray means relative to a ground surface, said tray angle adjustment means including an adjustable length cross-extending arm between said first and second rods, a downwardly extending arm fixedly secured to said cross-extending arm, and a threadably moveable stop member positioned through a threaded aperture within an end portion of said downwardly extending arm, said stop member being aligned with said first and second rods and being selectively abuttable against said rear section of said vehicle seat so as to exert a pivotal force against said tray means, thereby to effect said horizontal alignment of said top surface of said tray means relative to said ground surface.

* * * * *